US009504006B2

(12) United States Patent
Katabi et al.

(10) Patent No.: US 9,504,006 B2
(45) Date of Patent: Nov. 22, 2016

(54) TRANSPONDER LOCALIZATION

(71) Applicant: Massachusetts Institute of Technology, Cambridge, MA (US)

(72) Inventors: Dina Katabi, Cambridge, MA (US); Omid Salehi-Abari, Cambridge, MA (US); Deepak Vasisht, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/008,595

(22) Filed: Jan. 28, 2016

(65) Prior Publication Data

US 2016/0227508 A1 Aug. 4, 2016

Related U.S. Application Data

(60) Provisional application No. 62/110,003, filed on Jan. 30, 2015.

(51) Int. Cl.
*H04M 3/42* (2006.01)
*H04W 64/00* (2009.01)
*H04B 7/26* (2006.01)
*H04H 20/16* (2008.01)

(52) U.S. Cl.
CPC ............. *H04W 64/006* (2013.01); *H04B 7/26* (2013.01); *H04H 20/16* (2013.01)

(58) Field of Classification Search
CPC ............ H04W 4/02; H04L 29/08657; H04M 2207/18
USPC .................... 455/414.2, 422.1, 423, 418, 430
See application file for complete search history.

(56) References Cited

U.S. PATENT DOCUMENTS 6,980,086 B2 * 12/2005 Papp ...................... B60R 25/24
340/10.1
2004/0196930 A1 * 10/2004 Molnar ................ H04B 7/0837
375/344
2009/0303005 A1 12/2009 Tuttle
(Continued)

OTHER PUBLICATIONS

Mateo et al., "Location Technique Based on Pattern Recognition of Radio Signal Strength for Parking Management," International Journal of Sensor Networks and Data Communication, vol. 1 (2012) pp. 1-9.

(Continued)

*Primary Examiner* — Nghi H Ly
(74) *Attorney, Agent, or Firm* — Occhiuti & Rohlicek LLP

(57) ABSTRACT

A method processes a concurrently triggered response signal at a number of transceivers configured to operate at a channel carrier frequency, where at least some of the transceivers have distinct transmit carrier frequencies offset from the channel carrier frequency. The method includes receiving, at a first receiver, a response signal in response to a trigger signal, the response signal including a combination of a number of transceiver response signals, each transceiver response signal of the number of transceiver response signals corresponding to a different transceiver of the number of transceivers and having a distinct transmit carrier frequency, wherein at least some of the transceiver response signals overlap in time, and determining characteristics of the number of transceivers based on the carrier frequencies of the transceiver response signals, including determining a number of transceivers in the number of transceivers.

28 Claims, 11 Drawing Sheets

(56) References Cited

U.S. PATENT DOCUMENTS

2012/0139711 A1    6/2012   Nikitin
2014/0161205 A1*   6/2014   Jalloul .................. H04L 5/0016
                                                                375/295

OTHER PUBLICATIONS

Rahman et al., "Relative Location Estimation of Vehicles in Parking Management System," ISBN, Feb. 15-18, 2009, pp. 729-732.

\* cited by examiner

TRANSPONDER LOCALIZATION

CROSS-REFERENCE TO RELATED APPLICATIONS

This application claims the benefit of U.S. Provisional Application No. 62/110,003 filed Jan. 30, 2015, which is incorporated by reference.

BACKGROUND

This invention relates to communicating with, decoding, localizing, and counting of unmodified transponders in the presence of wireless collisions.

Electronic toll collection transponders (e.g., E-ZPass) are a widely used wireless technology. According to some estimates, 70% to 89% of cars in the United States include such transponders.

The transponders are usually simple devices including battery-powered radio frequency identification (RFID) circuitry. The most common use of electronic toll collection transponders is to quickly and automatically collect tolls for vehicles utilizing toll roads. In general, a toll for a vehicle is collected when the vehicle traverses a toll collection area (e.g., a toll booth) to enter and/or exit a toll road. To collect the toll, a RFID reader at the toll collection area emits a query signal which causes the transponder carried by the vehicle to emit a response signal including, among other attributes, a unique identifier for the transponder. A toll is charged to a customer (e.g., the owner of the vehicle) who is associated with the unique identifier.

Since there is no media access control (MAC) protocol for electronic toll collection transponders, the RFID readers at the toll collection area use highly directional antennas in isolated areas to ensure that responses emitted form multiple transponders are not received by the readers.

SUMMARY

In a general aspect, a method processes a concurrently triggered response signal at a number of transceivers configured to operate at a channel carrier frequency where at least some of the transceivers have distinct transmit carrier frequencies offset from the channel carrier frequency. The method includes receiving, at a first receiver, a response signal in response to a trigger signal, the response signal including a combination of a number of transceiver response signals, each transceiver response signal of the number of transceiver response signals corresponding to a different transceiver of the number of transceivers and having a distinct transmit carrier frequency, wherein at least some of the transceiver response signals overlap in time, and determining characteristics of the number of transceivers based on the carrier frequencies of the transceiver response signals, including determining a number of transceivers in the number of transceivers.

Aspects may include one or more of the following features.

The distinct transmit carrier frequencies of the at least some transceivers may be due to manufacturing variations in the transceivers. The number of transceivers may include a number of transponders. Each transponder of the number of transponders may be carried by a vehicle and determining the number of transceivers in the number of transceivers may include determining a number of vehicles in a vicinity of the first receiver. Determining the number of transceivers in the number of transceivers may include identifying a number of spectral peaks in a spectral representation of the response signal, each spectral peak corresponding to one or more carrier frequencies of one or more transceivers of the number of transceivers. Determining the number of transceivers in the number of transceivers may include determining that at least one of the spectral peaks in the spectral representation of the response signal corresponds to two or more transceivers of the number of transceivers.

Determining that the at least one spectral peak corresponds to two or more transceivers of the number of transceiver may include comparing a first magnitude of the at least one spectral peak in the response signal to a second magnitude of the at least one spectral peak in a second, time shifted version of the response signal, and identifying the at least one spectral peak as corresponding to two transceivers based on a difference between the first magnitude and the second magnitude. Determining the characteristics of the number of transceivers may include, for each transceiver of the one or more transceivers, determining a first angle of arrival of the transceiver response signal corresponding to the transceiver at the first receiver. Determining the characteristics of the number of transceivers may further include determining spatial locations for one or more transceivers of the number of transceivers based on the first angle of arrival determined for the one or more transceivers.

Determining the spatial locations for the one or more transceivers may include receiving the response signal at a second receiver and for each transceiver of the one or more transceivers, determining a second angle of arrival of the transceiver response signal corresponding to the transceiver at the second receiver, and determining the spatial location of the transceiver based on the first angle of arrival and the second angle of arrival. Determining the characteristics of the number of transceivers may include determining a number of transceiver identifiers, each transceiver identifier of the number of transceiver identifiers corresponding to a different transceiver of the number of transceivers. Determining the number of transceiver identifiers may include, for each transceiver of the number of transceivers, processing a number of response signals received during a time interval based on the distinct carrier frequency corresponding to the transceiver and the channel between the transceiver and the receiver, and determining an average response signal from the number of processed response signals.

At least some transceivers of the number of transceivers may be RFID transceivers. The method may further include determining an occupancy status for each of a number of parking spaces in range of the first receiver based on the characteristics of the number of transceivers.

In another general aspect, a system is configured to process a concurrently triggered response signal at a number of transceivers configured to operate at a channel carrier frequency where at least some of the transceivers having distinct transmit carrier frequencies offset from a channel carrier frequency. The system includes a first receiver including one or more antennas for receiving a response signal in response to a trigger signal, the response signal including a combination of a number of transceiver response signals, each transceiver response signal of the number of transceiver response signals corresponding to a different transceiver of the number of transceivers and having a distinct transmit carrier frequency, wherein at least some of the transceiver response signals overlap in time, and one or more signal processing modules configured to determine characteristics of the number of transceivers based on the carrier frequencies of the transceiver response signals, including determining a number of transceivers in the number of transceivers.

Aspects may include one or more of the following features.

The distinct transmit carrier frequencies of the at least some transceivers may be due to manufacturing variations in the transceivers. The number of transceivers may include a number of transponders. Each transponder of the number of transponders may be carried by a vehicle and determining the number of transceivers in the number of transceivers may include determining a number of vehicles in a vicinity of the first receiver. The one or more signal processing modules may be configured to determine the number of transceivers in the number of transceivers including identifying a number of spectral peaks in a spectral representation of the response signal, each spectral peak corresponding to one or more carrier frequencies of one or more transceivers of the number of transceivers. The one or more signal processing modules may be configured to determine the number of transceivers in the number of transceivers including determining that at least one of the spectral peaks in the spectral representation of the response signal corresponds to two or more transceivers of the number of transceivers.

The one or more signal processing modules may be configured to determine that the at least one spectral peak corresponds to two or more transceivers of the number of transceiver including comparing a first magnitude of the at least one spectral peak in the response signal to a second magnitude of the at least one spectral peak in a second, time shifted version of the response signal, and identifying the at least one spectral peak as corresponding to two transceivers based on a difference between the first magnitude and the second magnitude. The one or more signal processing modules may be configured to determine the characteristics of the number of transceivers including, for each transceiver of the one or more transceivers, determining a first angle of arrival of the transceiver response signal corresponding to the transceiver at the first receiver. The one or more signal processing modules may be configured to determine the characteristics of the number of transceivers including determining spatial locations for one or more transceivers of the number of transceivers based on the first angle of arrival determined for the one or more transceivers.

The one or more signal processing modules may be configured to determine the spatial locations for the one or more transceivers including receiving the response signal at one or more antennas of a second receiver and for each transceiver of the one or more transceivers, determining a second angle of arrival of the transceiver response signal corresponding to the transceiver at the second receiver, and determining the spatial location of the transceiver based on the first angle of arrival and the second angle of arrival. The one or more signal processing modules may be configured to determine the characteristics of the number of transceivers including determining a number of transceiver identifiers, each transceiver identifier of the number of transceiver identifiers corresponding to a different transceiver of the number of transceivers. The one or more signal processing modules may be configured to determine the number of transceiver identifiers including, for each transceiver of the number of transceivers, processing a number of response signals received during a time interval based on the carrier frequency corresponding to the transceiver and the channel between the transceiver and the receiver; and determining an average response signal from the number of processed response signals.

At least some transceivers of the number of transceivers may be RFID transceivers. The one or more signal processing modules may be configured to determine an occupancy status for each of a number of parking spaces in range of the first receiver based on the characteristics of the number of transceivers.

Some transponder counting and localization technologies utilize MAC protocols to prevent signal collisions between transponders. Other technological approaches allow for signal collisions between transponders, but force each transponder to transmit at a predefined frequency, different from the predefined frequencies of the other transponders.

Existing and widely deployed transponders such as electronic toll collection transponders may not be configured to operate according to a MAC protocol and are generally all specified as having the same predefined frequency. Thus, the conventional technological approaches described above may not be capable of counting and localizing transponders that already exist and are widely deployed.

Aspects described herein improve upon the existing technology of transponder counting and localization by providing a technique for counting and localizing transponders that are designed to transmit at a common carrier frequency and in the presence of signal collisions (and in the absence of a MAC protocol). In particular, aspects described herein emerge from a realization that electronic toll collection transponders have the potential to be used for a number of applications other than toll collection. For example, the transponders can be used to determine a number of cars traversing a traffic intersection (e.g., to adapt timing of traffic lights). The transponders can also be used to localize individual vehicles for the purpose of parking management, traffic law enforcement, and so on.

In some aspects, an RFID reader is able to receive and distinguish temporally overlapping response signals from multiple transponders. In some examples, the response signals are distinguished using carrier frequency offsets associated with each of the transponders. These carrier frequency offsets are often present in electronic toll collection transponders due to manufacturing variations in the transponders.

Among other advantages aspects described herein use widely deployed RFID transponders to obtain data for use by smart city applications.

Other features and advantages of the invention are apparent from the following description, and from the claims.

DESCRIPTION

1 Transponder Counting

Figure 1:
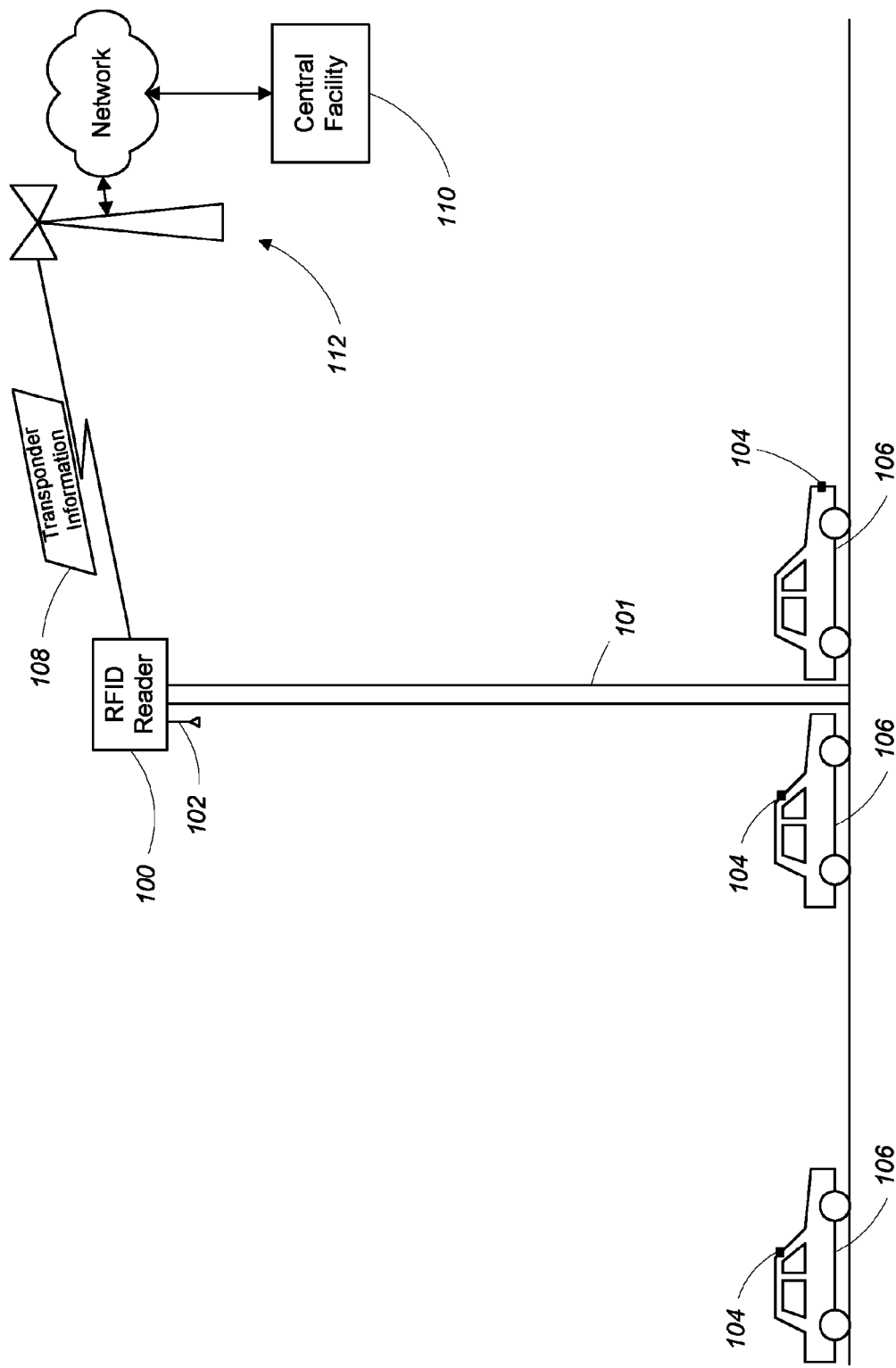
FIG. 1 is a first embodiment of an RFID reader in an operational environment.

Referring to FIG. 1, a first embodiment of an RFID reader 100 is affixed to a post 101 in an environment (e.g., a traffic intersection) where vehicles 106 are present. The RFID reader 100 is configured to query transponders 104 (e.g., electronic toll collection transponders or transceivers) attached to the vehicles 106 to determine transponder information 108 including characteristics of the transponders such as a number of transponders that are in range of the RFID reader 100.

In some examples, the RFID reader 100 sends the transponder information 108 to a central facility 110 (e.g., a traffic management system) over a network 112 (e.g., a cellular data network). In some examples, the central facility 110 analyzes the transponder information 108 at different times of the day to track the number of cars present in the environment (e.g., at the traffic intersection) over time. This information can be used by "smart city" applications such as traffic management applications which adjust or adapt timing of traffic lights based on traffic flow at intersections and/or other locations in the city.

Figure 2:
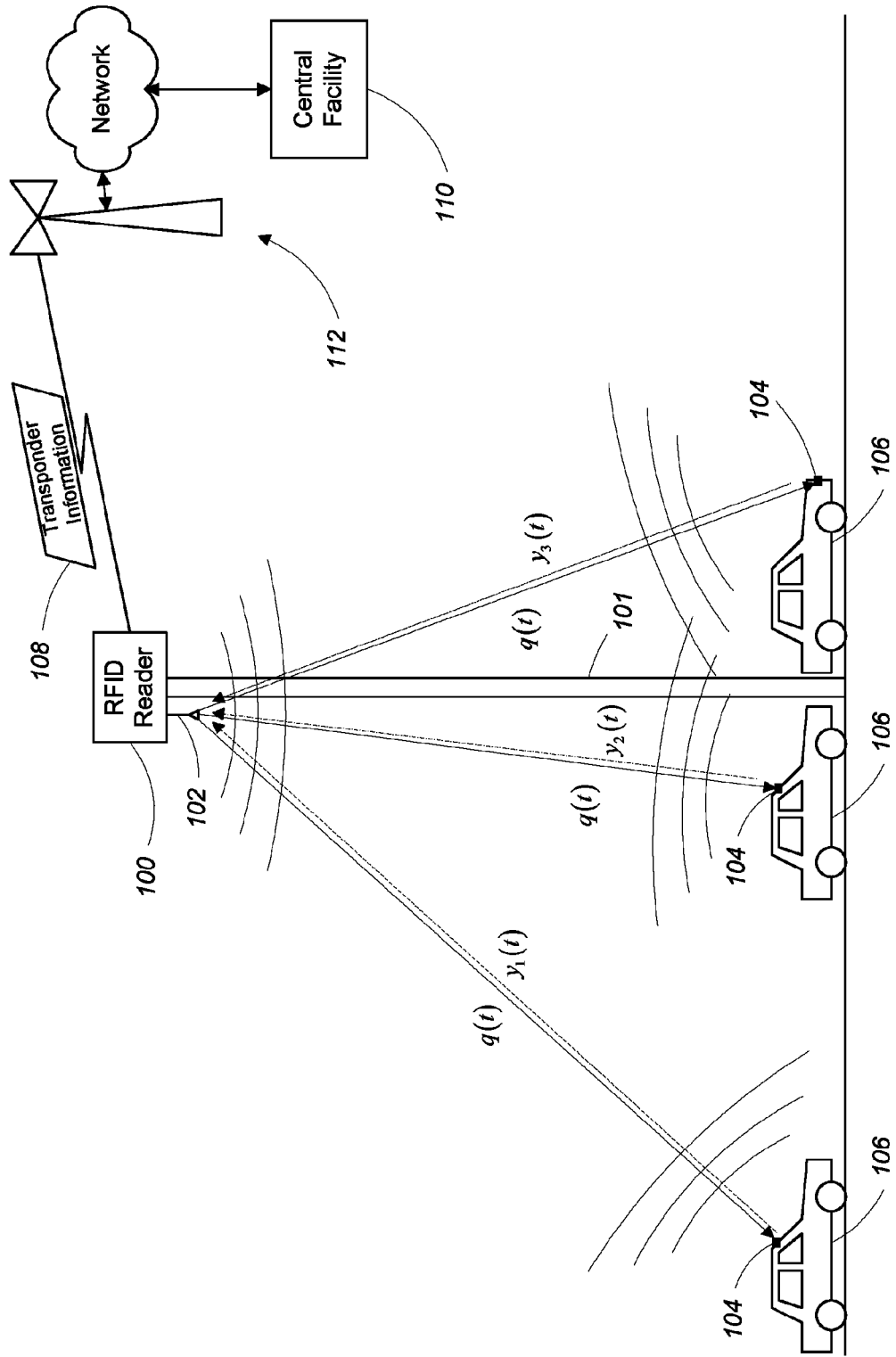
FIG. 2 shows an operation of the RFID reader of FIG. 1.

Referring to FIG. 2, to determine the transponder information 108, the RFID reader 100 transmits a query signal, q(t) from an antenna 102. Any transponders 104 within range of the RFID reader 100 receive the query signal and, in response to receiving the query signal, transmit response signals, $y_i(t)$ back to the reader 100. The transponders 104 transmit their response signals at substantially the same time, resulting in transmission of a combined response signal, y(t) to the RFID reader 100. The combined response signal can be represented as a combination of the response signals transmitted by the individual transponders 104 as follows:

$$y(t)=y_1(t)+y_2(t)\ldots y_n(t)$$

In some examples, each of the individual transponder response signals can be expressed as:

$$y_i(t)=h_i \cdot s(t)_i \cdot e^{j2\pi f_{ci}t}$$

where $h_i$ is a complex channel coefficient between the $i^{th}$ transponder 104 and the RFID reader 100, $s(t)_i$ is an on-off keying (OOK) modulation function for encoding the $i^{th}$ transponder response data (e.g., a 256 bit transponder response), and $f_{ci}$ is a carrier frequency associated with the $i^{th}$ transponder. In general, the response signals $y_i(t)$ are transmitted at substantially the same time and therefore temporally overlap.

In the example of FIG. 2, since there are three transponders 104 within range of the reader 100, three response signals, $y_1(t)$, $y_2(t)$ and $y_3(t)$, so y(t) is expressed as:

$$y(t)=y_1(t)+y_2(t)+y_3(t)$$

1.1 RFID Reader

Figure 3:
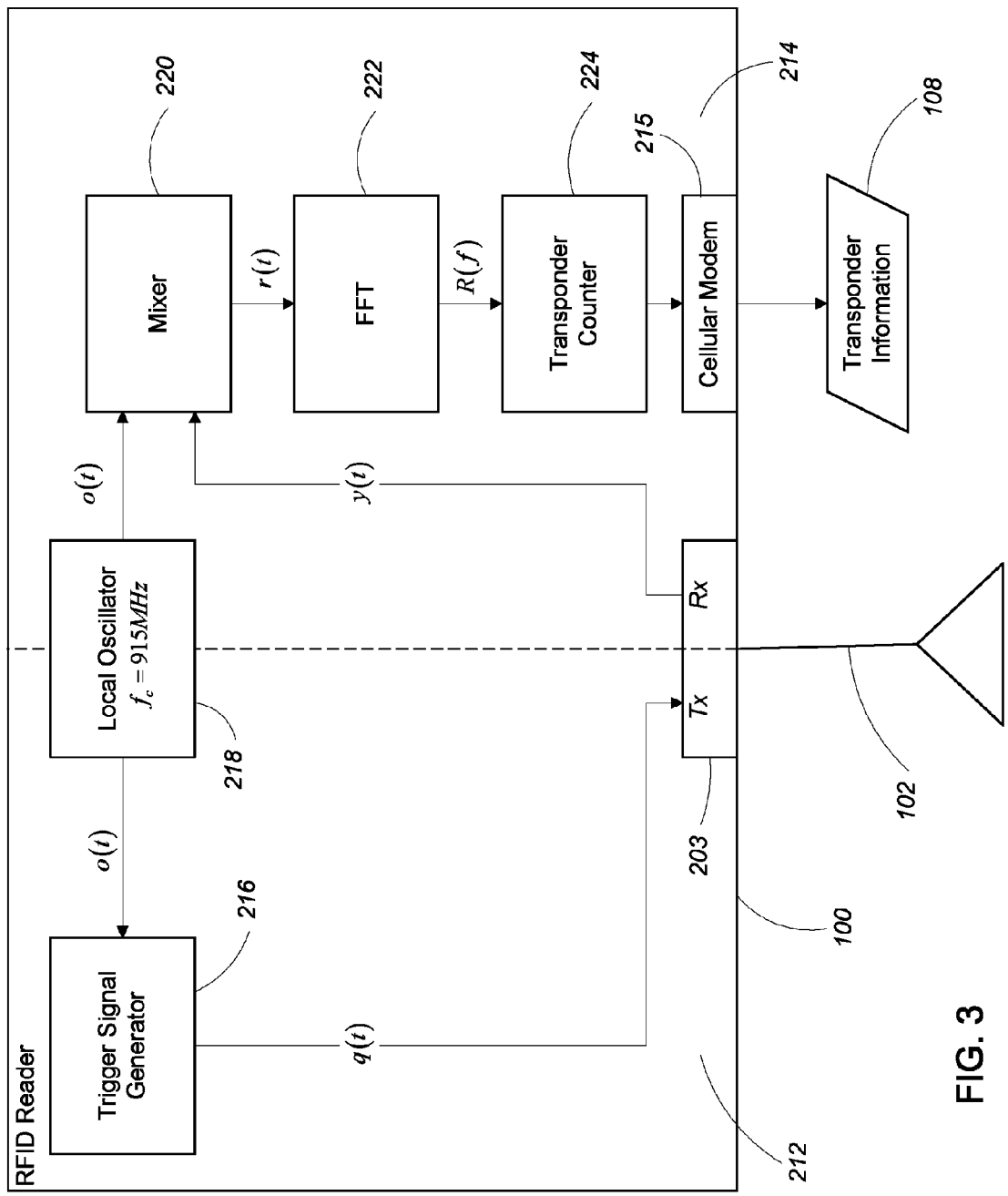
FIG. 3 is a schematic block diagram of the RFID reader of FIG. 1.

Referring to FIG. 3, the RFID reader 100 receives the combined response signal, $y(t)=y_1(t)+y_2(t)+y_3(t)$ at the antenna 102 and processes the combined response signal to determine the transponder information 108.

The RFID reader 100 includes a transmitter section 212 and a receiver section 214. A local oscillator 216 is shared by the transmitter section 212 and the receiver section 214 and oscillates at a carrier frequency, $f_c$ of approximately 915 MHz (i.e., a carrier frequency commonly used by electronic toll collection transponders and readers). The transmitter section 212 includes a query signal generator 218 which receives an oscillation signal, o(t) (e.g., a sine wave with a frequency of 915 MHz) from the local oscillator 216 and uses the oscillation signal to generate the query signal, q(t) which it provides to a transmitter section of an antenna interface 203. The antenna interface 203 causes transmission of the query signal, q(t) from the RFID reader 100 via the antenna 102. In some examples, the query signal generator 218 simply generates an amplified version of the oscillation signal, o(t) such that the query signal, q(t) is a sine wave at the carrier frequency, $f_c$.

As is described above with reference to FIG. 2, at some point after transmission of the query signal, q(t) from the antenna 102, the combined response signal, y(t) which is a combination of a number of temporally overlapping transponder response signals, is received at the antenna 102. In general, the temporally overlapped nature of the response signal, y(t) is undesirable to conventional systems (e.g., conventional electronic toll collection systems) because such systems are not capable of distinguishing the temporally overlapping (i.e., colliding) response signals from the individual transponders 106 from one another.

As is described in greater detail below, the RFID reader 100 is configured to process the combined response signal, y(t) to distinguish the response signals from individual transponders from one another. The RFID reader 100 then determines the transponder information 108, including the number of transponders in range of the RFID reader 100 from the distinguished response signals. In some examples, the RFID reader 100 does so by leveraging the fact that each of the transponders 104 has a local oscillator with a slightly different carrier frequency for example, resulting from manufacturing variation or from environmental differences. Some conventional electronic toll collection transponders are specified as having a carrier frequency of 915 MHz but, due to manufacturing variations, generally have carrier frequencies in the range of 914.3 MHz-915.5 MHz (i.e., a 1.2 MHz range).

The receiver section 214 of the reader 100 includes a mixer 220, a fast Fourier transform (FFT) module 222, and a transponder counter module 224. The mixer 220 receives the combined response signal, y(t) and the oscillator signal, o(t) from the local oscillator 216 as inputs and uses the oscillation signal to downmix the combined response signal to a baseband signal, r(t) (e.g., by multiplying y(t) and o(t)). The resulting baseband signal can be expressed as:

$$r(t) = \sum_{i=1}^{n} h_i \cdot s_i(t) \cdot e^{j2\pi \Delta f_i}$$

$$r(t) = \sum_{i=1}^{n} h_i \cdot (0.5 + s'_i(t)) \cdot e^{j2\pi \Delta f_i}$$

where $\Delta f_i$ is the carrier frequency offset (i.e., $f_c - f_{c_i}$) between the $i^{th}$ transponder 104 and the receiver 100 and (0.5+$s'_i$ (t)) is the $s_i$ (t) signal shifted to have a zero mean.

The baseband signal, r(t) is provided to the FFT module 222 which determines a frequency domain representation of r(t) as follows:

$$R(f) = \sum_{i=1}^{n} \frac{h_i}{2} \cdot \delta(f - \Delta f_i) + h_i \cdot S'_i(f - \Delta f_i)$$

where $S'_i(f)$ is the frequency domain representation of $s'_i(t)$ and $\delta(f)$ is the unit impulse function. Note that, for the $i^{th}$ transponder, the frequency domain representation includes an impulse with a magnitude of $h_i/2$ (i.e., the channel coefficient for the channel between the antenna 102 and the $i^{th}$ transponder divided by 2).

Figure 4:
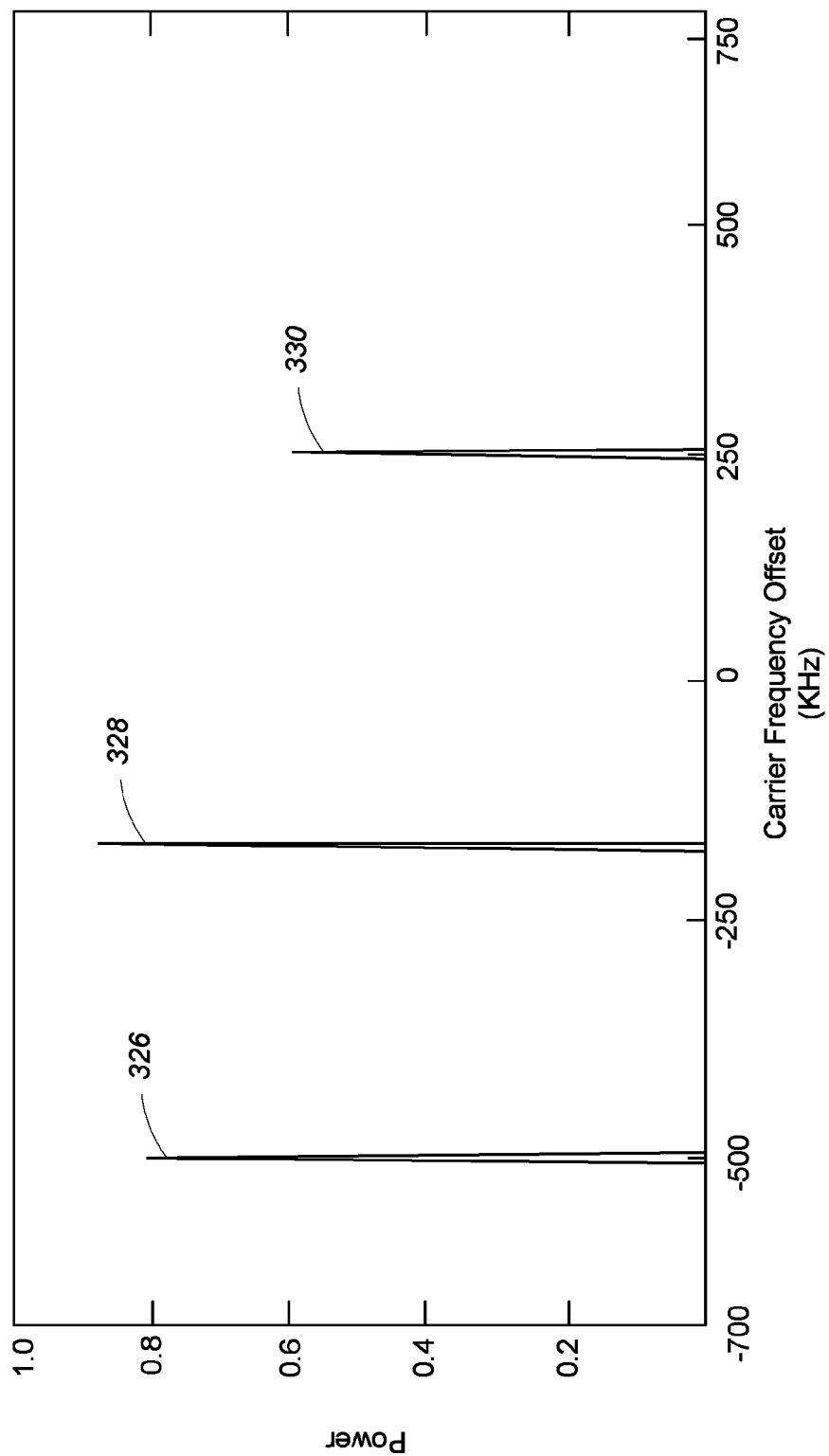
FIG. 4 is a frequency spectrum of a baseband combined response signal.

The frequency domain representation, $R(f)$ is provided to the transponder counter 224 which processes the frequency domain representation, $R(f)$ to determine the transponder count for inclusion in the transponder information 108. Referring to FIG. 4, a graph of the frequency domain representation, $R(f)$ for the example of FIG. 2 shows a first peak 326, a second peak 328, and a third peak 330, each peak corresponding to a carrier frequency offset of a different one of the three transponders 104 shown in FIG. 2. For example, the first peak 326 corresponds to a carrier frequency offset of approximately −500 kHz, the second peak 328 corresponds to a transponder 104 with a carrier frequency with a carrier frequency offset of approximately −200 kHz, and the third peak 330 corresponds to a transponder 104 with a carrier frequency of approximately 250 kHz.

In one simple example, the transponder counter 224 determines the transponder count 108 by counting a number of peaks in the frequency domain representation, $R(f)$ that exceed a predetermined threshold. In the example of FIG. 2, the transponder counter 224 determines the transponder count to be 3 transponders.

However, it is noted that the resolution of the frequency domain representation, $R(f)$ is expressed as:

$$\delta f = \frac{1}{T}$$

where T is the FFT time window. In some examples, a typical response signal transmitted by a transponder has a length of 512 μs, so the maximum FFT time window is 512 μs. If the frequency domain representation, $R(f)$ is determined using an FFT time window of 512 μs, the frequency resolution of the frequency domain representation, $R(f)$ is 1.95 kHz. With a 1.2 MHz range of carrier frequency offsets and a 1.2 MHz sampling rate, there are 615 FFT bins each with a width of 1.95 kHz. Thus, it is conceivable that two or more transponders may have carrier frequency offsets that differ by less than 1.95 kHz and therefore have peaks that fall into the same FFT bin. In such cases, using the simple thresholding technique described above, the transponder counter 224 would mistakenly count only one transponder for the two peaks that fall into the same FFT bin.

To avoid mistakenly counting only one transponder for two peaks that fall into a same FFT bin, the transponder counter 224 is configured to leverage the phase rotation property of the Fourier transform. In particular, the phase rotation property of the Fourier transform states that a shift in the time domain representation of a signal translates into a phase rotation in the frequency domain representation of the signal:

$$\mathcal{F}\{r(t)\}=R(f)$$

$$\mathcal{F}\{r(t+\tau)\}=R(f)e^{j2\pi f\tau}$$

Due to the phase rotation property of the Fourier transform, if a peak in the frequency domain representation, $R(f)$ corresponds to only a single transponder response signal, then a performing an FFT on the same signal with a time shift, $\tau$ causes a phase rotation of the peak value but results in a unchanged magnitude of the peak:

$$\|R(f)\|=\|R(f)e^{j2\pi f\tau}\|$$

However, if a peak in the frequency domain representation, $R(f)$ corresponds to two or more transponder response signals (i.e., $T_1$ and $T_2$), then a performing an FFT on the same signal with a time shift, $\tau$ causes a phase rotation of the peak value but also results in the peak having a different magnitude:

$$\|R(f_{T_1})+R(f_{T_2})\| \neq \|R(f_{T_1})e^{j2\pi f_{T_1}\tau}+R(f_{T_2})e^{j2\pi f_{T_2}\tau}\|$$

Thus, in some examples, the transponder counter 224 determines a time shifted version of the frequency domain representation, $R(f)e^{j2\pi f\tau}$ in addition to the frequency domain representation, $R(f)$. Each of the frequency domain representations has the same number of peaks. The transponder counter 224 compares the magnitude of corresponding peaks in the two frequency domain representations and, if the magnitude of a given peak differs between the two frequency domain representations (e.g., the difference between the two magnitudes is greater than the noise in the signal), the transponder counter counts that peak as corresponding to two transponders.

2 Parking Management

Figure 5:
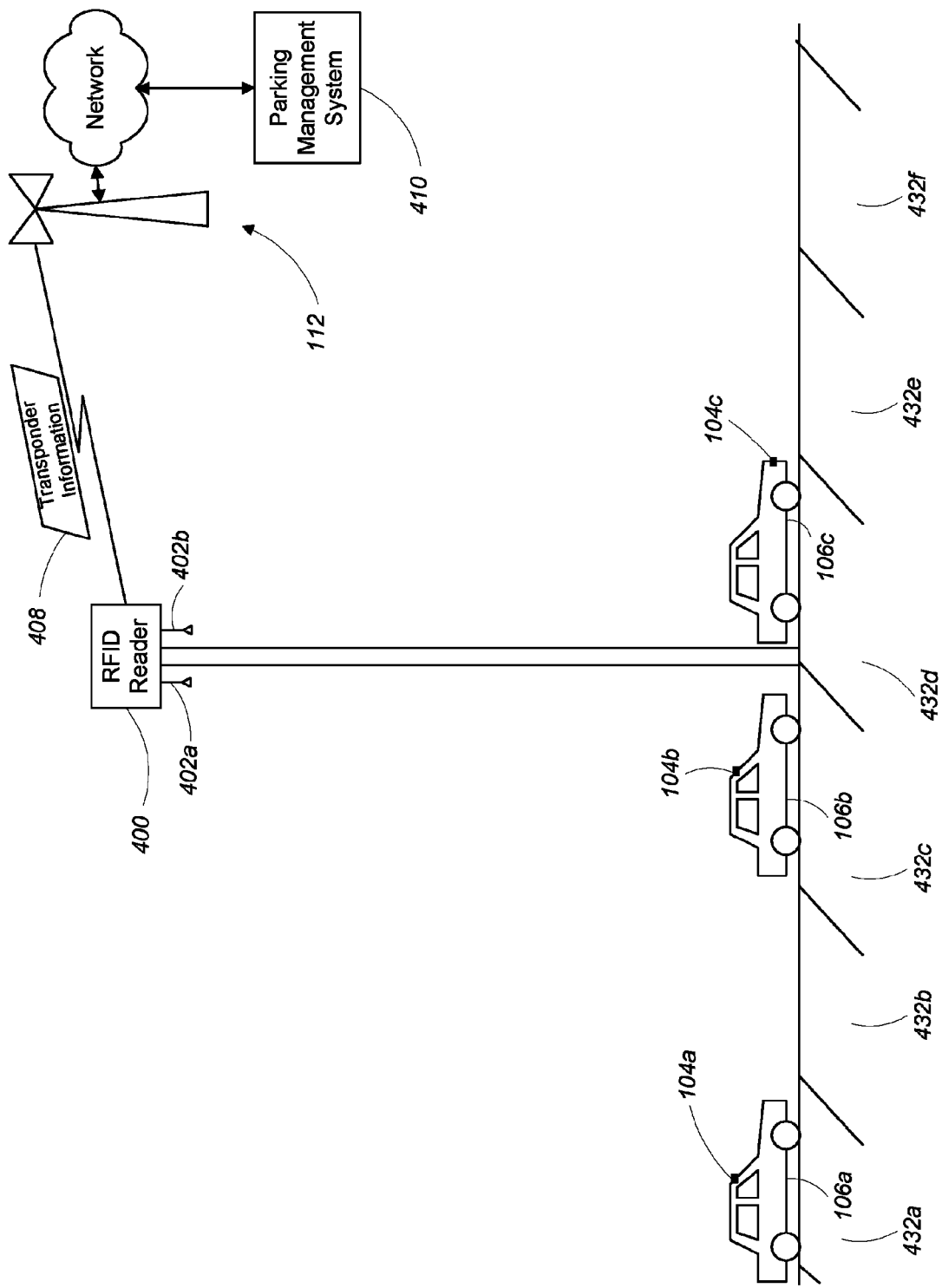
FIG. 5 is a second embodiment of an RFID reader in an operational environment.

Referring to FIG. 5, another embodiment of an RFID reader 400 is affixed to a post 101 in a location adjacent to a number of parking spaces 432a-432f. The RFID reader 400 is configured to query transponders 140 in its environment (e.g., a parking lot) to determine transponder information 408. In some examples, the transponder information 408 includes a number of transducers in the range of the RFID reader 400, a spatial angle between each of the transducers 104 and the RFID reader 400, and an indication of which of the parking spaces are occupied.

In some examples, the RFID reader 400 sends the transponder information 408 to a parking management system 410 over a network 112 (e.g., a cellular data network). The parking management system 410 uses transponder information 408 to bill the bank accounts associated with the transponders for parking fees and to determine parking space occupancy information that can be used to help drivers find unoccupied parking spaces.

2.1 RFID Reader

Figure 6:
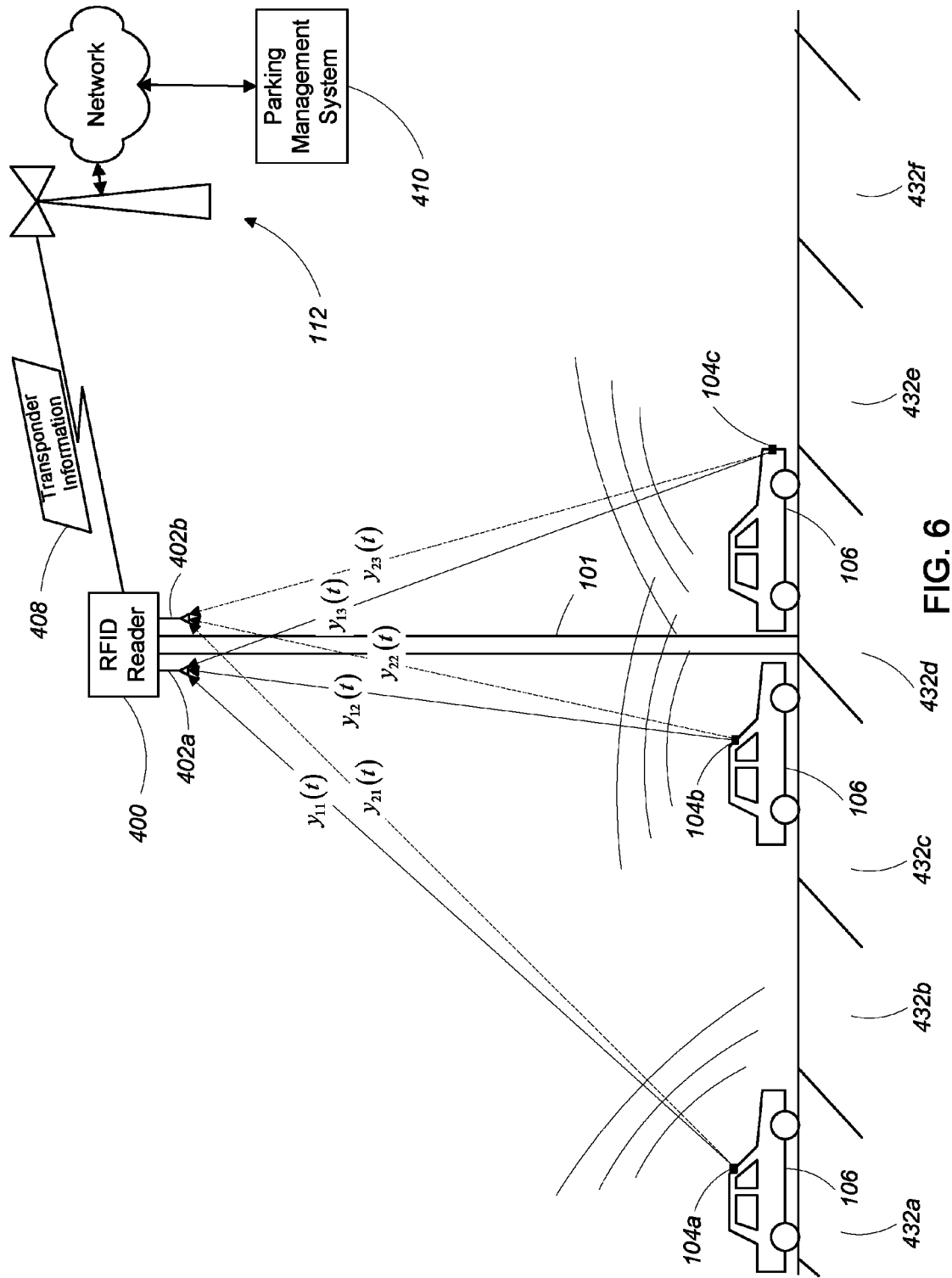
FIG. 6 shows an operation of the RFID reader of FIG. 5.

Referring to FIG. 6, to determine the transponder information 408, the RFID reader 400 transmits a query signal, q(t) (not shown) from one or both of two antennas 402a, 402b. Any transponders 104 within range of the RFID reader 400 receive the query signal and, in response to receiving the query signal, transmit response signals back to the RFID reader 400. The transponders 104 transmit their response signals at substantially the same time, resulting in transmission of a combined response signal, y(t) to the RFID reader 400. Due to the spatial separation of the antennas 402a, 402b (by a distance, d), the antennas receive different versions of the combined response signal, y(t). In particular, the first antenna 402a receives a first version of the combined response signal, $y_1(t)$ and the second antenna 402b receives a second version of the combined response signal, $y_2(t)$. Each combined response signal can be represented as a summation of the response signals transmitted by the individual transponders 104 with each response signal multiplied by the channel between the transponder and the receiving antenna. That is the first version of the combined response signal can be represented as:

$$y_1(t)=y_{11}(t)+y_{12}(t)\ldots y_{1n}(t)$$

and the second version of the response signal can be represented as:

$$y_2(t)=y_{21}(t)+y_{22}(t)\ldots y_{2n}(t)$$

where n is the number of transponders in range of the RFID reader 400.

As was the case above, the version of the response signal received from each transponder can be expressed as:

$$y_{ji}(t)=h_{ji}\cdot s(t)_i\cdot e^{j2\pi f_{ci}t}$$

where $h_{ji}$ is a complex channel coefficient between the $i^{th}$ transponder 104 and the $j^{th}$ antenna of the RFID reader 400, $s(t)_i$ is an on-off keying (OOK) modulation function for encoding the $i^{th}$ transponder response data (e.g., a 256 bit transponder response), and $f_{ci}$ is a carrier frequency associated with the $i^{th}$ transponder.

In the example of FIG. 6, since there are three transponders 104 within range of the RFID reader 400, the first combined response signal is:

$$y_1(t)=y_{11}(t)+y_{12}(t)+y_{13}(t)$$

and the second combined response signal is:

$$y_2(t)=y_{21}(t)+y_{22}(t)+y_{23}(t).$$

Figure 7:
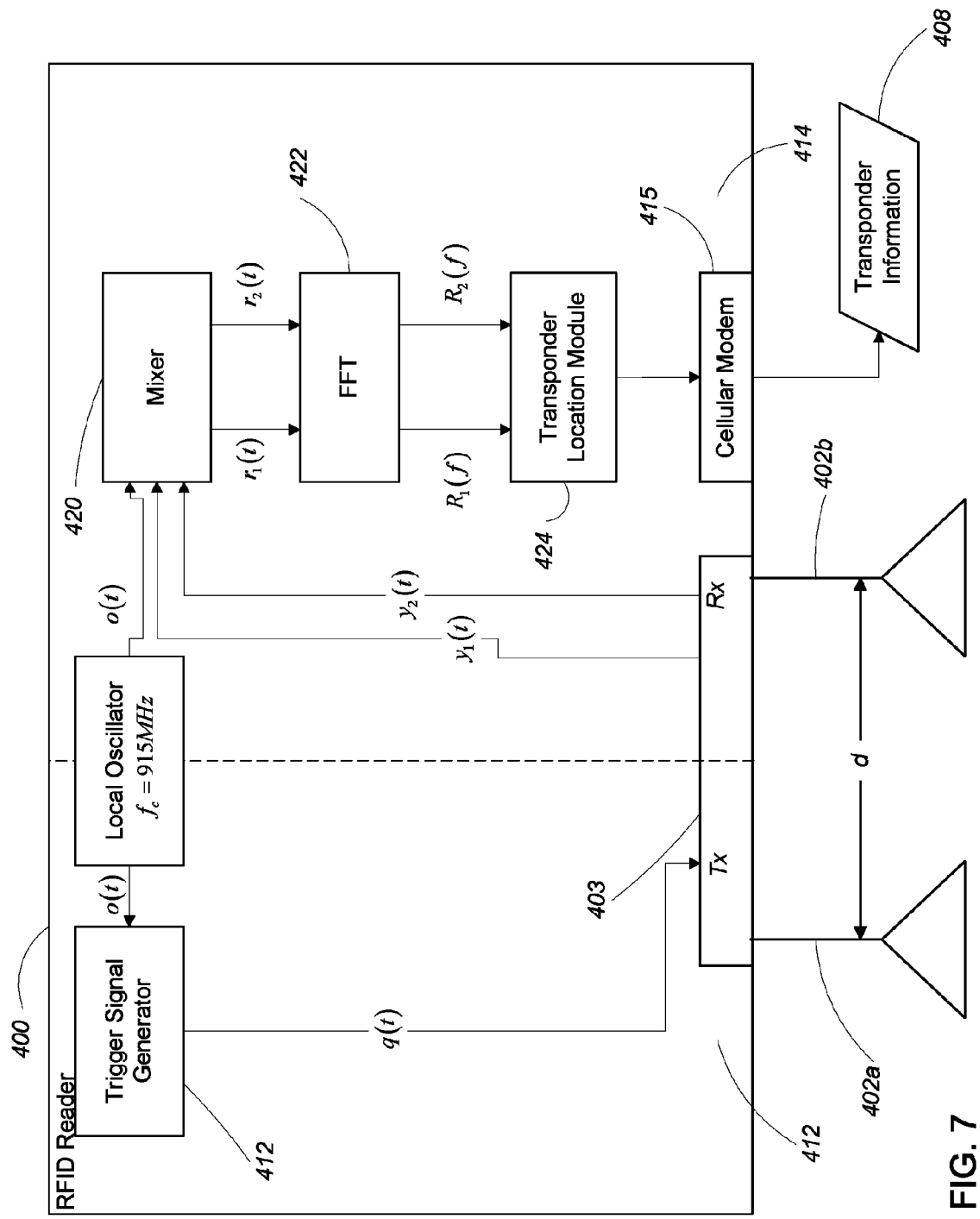
FIG. 7 is a schematic block diagram of the RFID reader of FIG. 5.

Referring to FIG. 7, the RFID reader 400 receives the first combined response signal, $y_1(t)$ at its first antenna 402a and the second combined response signal, $y_2(t)$ at it's second antenna 402b and processes the combined response signals, $y_1(t)$ and $\alpha_2(t)$ to determine the transponder information 408.

The reader 400 includes a transmitter section 412 and a receiver section 414. A local oscillator 416 is shared by the transmitter section 412 and the receiver section 414 and oscillates at a carrier frequency, $f_c$ of 915 MHz (i.e., a carrier frequency commonly used by electronic toll collection transponders).

The transmitter section 412 includes a query signal generator 418 that receives an oscillation signal, o(t) (e.g., a sine wave with a frequency of 915 MHz) from the local oscillator 416 and uses the oscillation signal to generate the query signal, q(t). The query signal is provided to a transmitter section of an antenna interface 403. The antenna interface 403 causes transmission of the query signal from the RFID reader 400 via one or both of the antennas 402a, 402b. In some examples, the query signal generator 418 simply generates an amplified version of the oscillation signal, o(t) such that the query signal, q(t) is a sine wave at the carrier frequency, $f_c$.

As is described above with reference to FIG. 6, at some point after transmission of the query signal, q(t) from the antenna(s) 402a, 402b, the first version of the combined response signal, $y_1(t)$ is received at the first antenna 402a and the second version of the combined response signal, $y_2(t)$ is received at the second antenna 402b. The receiver section 414 is configured to process the first version of the combined response signal, $y_1(t)$ and the second version of the combined response signal, $y_2(t)$ to determine the transponder locations.

The receiver section 414 includes a mixer 420, a fast Fourier transform (FFT) module 422, and a transponder location module 424. The mixer receives first and second versions of the combined response signal, $y_1(t)$, $y_2(t)$ from the antenna interface 403 and the oscillator signal, o(t) from the local oscillator 416 as inputs and uses the oscillation signal to downmix the first version of the combined response signal, $y_1(t)$ to a first baseband signal, $r_1(t)$ and to downmix the second version of the combined response signal, $y_2(t)$ to a second baseband signal, $r_2(t)$ (e.g., by multiplying $y_1(t)$ and $y_2(t)$ by o(t)).

The first baseband signal, $r_1(t)$ and the second baseband signal, $r_2(t)$ are provided to the FFT module 422 which determines a first frequency domain representation, $R_1(f)$ from the first baseband signal, $r_1(t)$ and a second frequency domain representation, $R_2(f)$ from the second baseband signal, $r_2(t)$.

The first frequency domain representation, $R_1(f)$ and the second frequency domain representation, $R_2(f)$ are provided to the transponder location module 424 which processes the frequency domain representations to determine the transponder information 408.

In some examples, the transponder location module 424 determines a spatial angle between each transponder 104 and the RFID reader 400 according to the equation:

$$\cos(\alpha) = \frac{\Delta\phi}{2\pi}\frac{\lambda}{d}$$

where $\alpha$ is the spatial angle, $\Delta\phi$ is the phase angle between the two antennas (i.e., $\Delta\phi=\phi_2-\phi_1$), d is the distance between the antennas, and $\lambda$ is the wavelength of the carrier signal.

While d and $\lambda$ are known, $\Delta\phi$ is unknown and needs to be measured before $\alpha$ can be determined. In the case of only a single transponder, $\Delta\phi$ can be determined as:

$$\Delta\phi = \angle\frac{r_2(t)}{r_1(t)} = \angle\frac{h_{21}\cdot s(t)e^{j2\pi\Delta f_1 t}}{h_{11}\cdot s(t)e^{j2\pi\Delta f_1 t}} = \angle\frac{h_{21}}{h_{11}}$$

where, $r_1(t)$ is the first baseband signal, $r_2(t)$ is the second baseband signal, $h_{11}$ is the channel between the transponder and the first antenna 402a, and $h_{21}$ is the channel between the transponder and the second antenna 402b.

However, in situations where first baseband signal, $r_1(t)$ and the second baseband signal, $r_2(t)$ include signal components from two or more transponders, the simple approach described above does not work due to the differing channels between the transponders and the antennas. That is, $$\angle\frac{r_2(t)}{r_1(t)} \neq \angle\frac{h_{2i}}{h_{1i}}.$$

For this reason, the transponder location module 424 uses a different approach to determine $\Delta\phi$. In particular, the transponder location module 424 processes the first frequency domain representation, $R_1(f)$ and the second frequency domain representation, $R_2(f)$ to identify peaks corresponding to the carrier frequency offsets ($\Delta f_{ji}$ of the individual transponders) in each of the frequency domain representations (as is described above). Then, for each peak at a carrier frequency offset, $\Delta f_{1i}$ in the first frequency domain representation, $R_1(f)$, the transponder location module 424 determines a first magnitude for the peak. The transponder location module also determines a second magnitude for the corresponding peak at the carrier frequency offset $\Delta f_{1i}$ in the second frequency domain representation, $R_2(f)$.

As is noted above, the first magnitude corresponds to the channel coefficient for the channel between the first antenna 402a and the $i^{th}$ transponder divided by 2, $h_{1i}/2$. The second magnitude corresponds to the channel coefficient for the channel between the second antenna 402b and the $i^{th}$ transponder divided by 2, $h_{2i}/2$. Using the first magnitude and the second magnitude, $\Delta\phi$ can be determined as follows:

$$\Delta\phi = \angle \frac{R_2(\Delta f_i)}{R_1(\Delta f_i)} = \angle \frac{h_{2i}}{h_{1i}}$$

With $\Delta\phi$ known, the spatial angle, $\alpha$ can be determined by the transponder location module 424. In general, the spatial angle, $\alpha$ and the number of transponders, n is sufficient for certain applications such as parking management systems.

Figure 8:
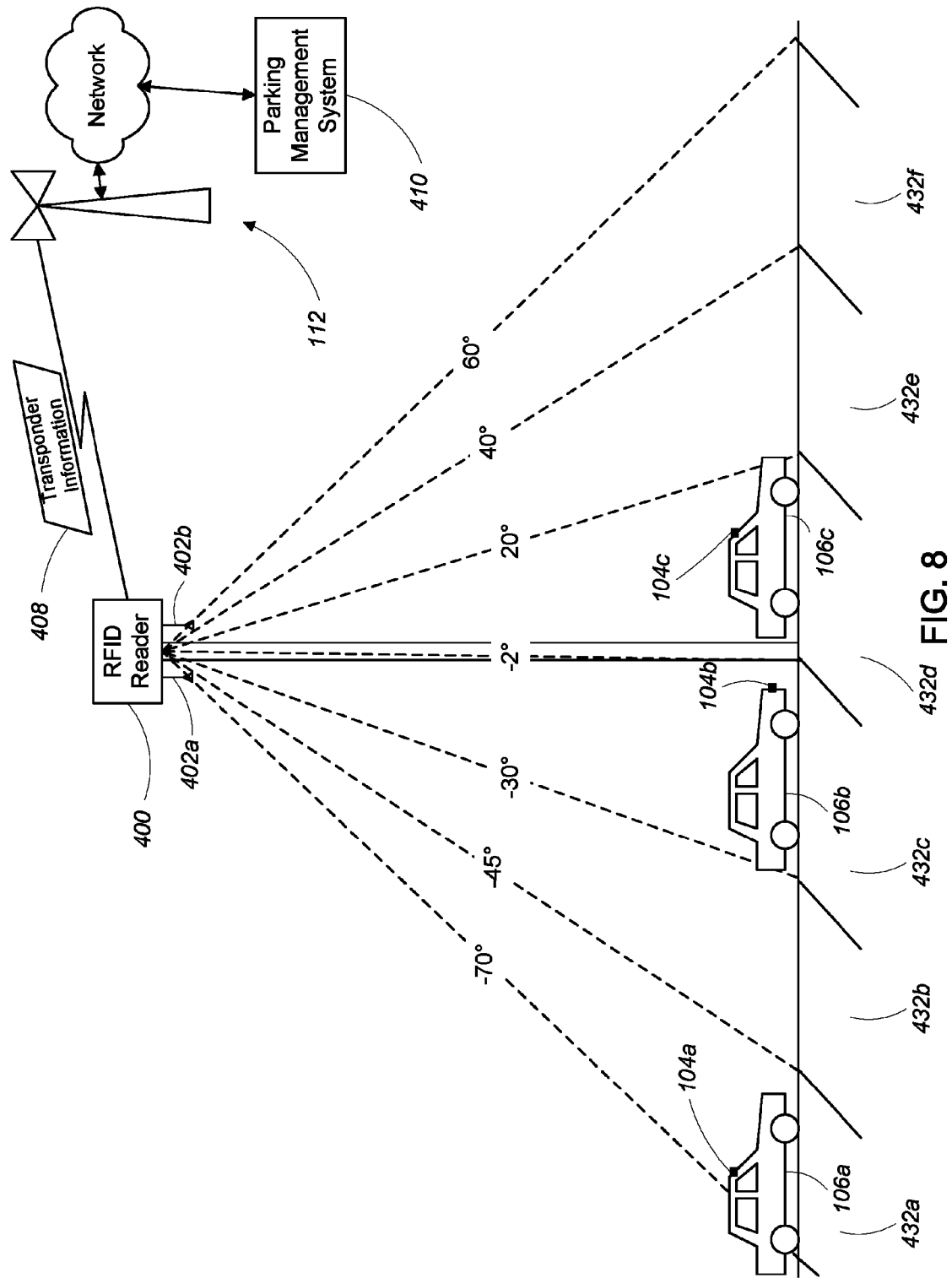
FIG. 8 shows a number of ranges of spatial angles associated with a number of parking spaces.

For example, referring to FIG. 8, each of the parking spaces 432a-432f within range of the RFID reader 400 is associated with a range of spatial angles. In the figure, a first parking space 432a is associated with a range of spatial angles from −70° to −45°, a second parking space 432b is associated with a range of spatial angles from −45° to −30°, a third parking space 432c is associated with a range of spatial angles from −30° to −2°, a fourth parking space 432d is associated with a range of spatial angles from −2° to 20°, a fifth parking space 432e is associated with a range of spatial angles from 20° to 40°, and a sixth parking space 432f is associated with a range of spatial angles from 40° to 50°.

In the Example of FIG. 5, a first transponder 104a is located in the range of spatial angles associated with the first parking space 432a, a second transponder 104b is located in the range of spatial angles associated with the third parking space 432c, and a third transponder 104c is located in the range of spatial angles associated with the fourth parking space 432d. In this example, transponder location module 424 of FIG. 7 identifies the first transponder 104a as having a spatial angle of −65° and therefore associates the first transponder 104a with the first parking space 432a. The transponder location module 424 identifies the second transponder 104b as having a spatial angle of −8° and therefore associates the second transponder 104b with the third parking space 432b. Finally, the transponder location module 424 identifies the third transponder 104c as having a spatial angle of 12° and therefore associates the third transponder 104c with the fourth parking space 432d.

The transponder location module 424 of FIG. 7 then forms the transponder information 408, including the associations between the transponders 104 and the parking spaces 432, and provides the transponder information 408 to a cellular modem 415 which sends the transponder information 408 to the parking management system 410 via the network 112. The parking management system 410 can uses the transponder information 408 to manage parking transactions and parking space occupancy.

2.2 Transponder Localization

Figure 9:
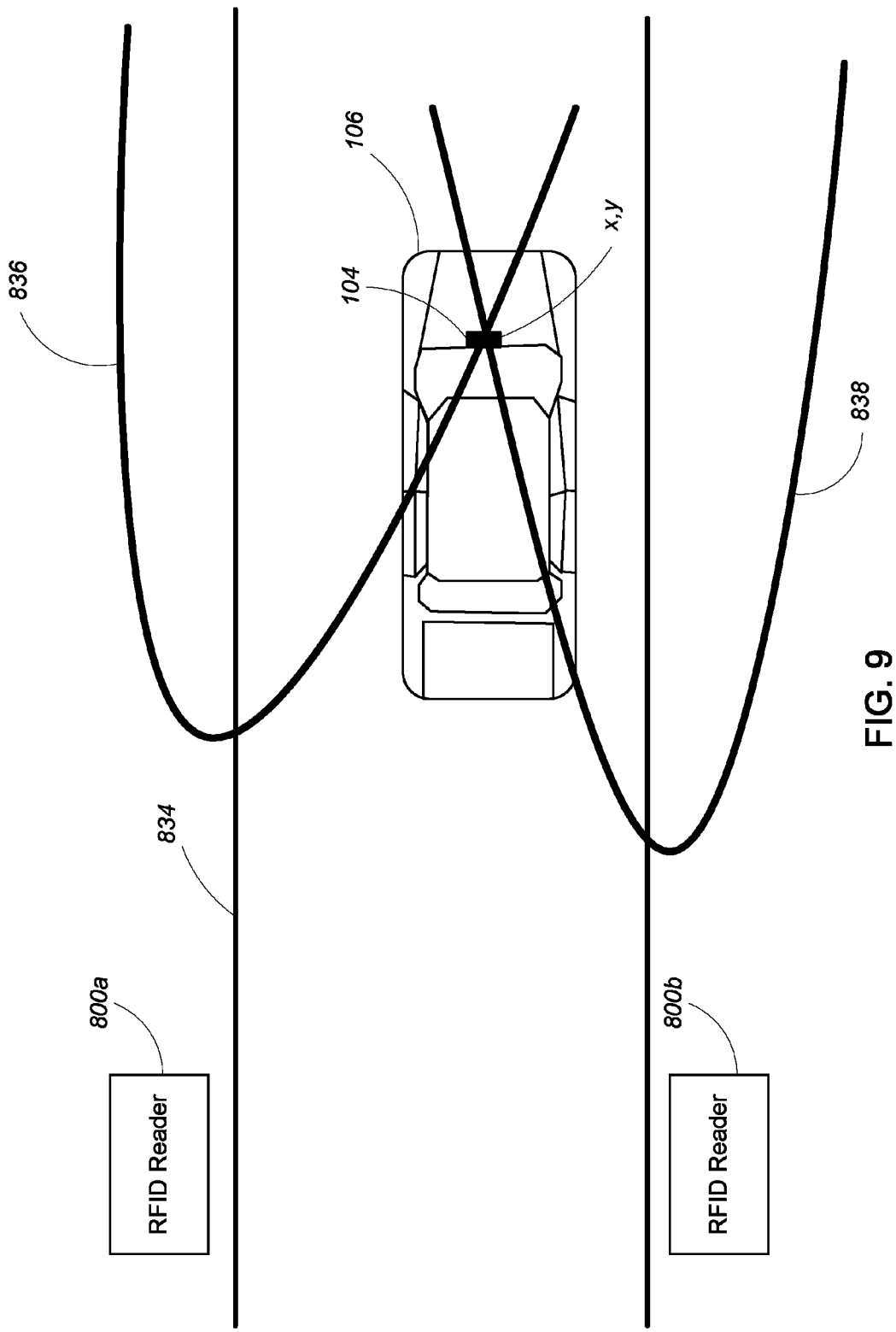
FIG. 9 shows localization of a transponder attached to a vehicle.

Referring to FIG. 9, in some examples the transponder location module 424 uses the spatial angle, $\alpha$ to determine a point in space where the transponder is located. In particular, the spatial angle does not correspond to a single point in space but instead corresponds to all points on the surface of a cone whose altitude axis is parallel to the ground. An equation for the cone is:

$$y^2+z^2=r^2=(\tan(\alpha)\cdot x)^2$$

where x, y, and z are the spatial coordinates of the transponder with respect to a point between the antennas. The transponder location module 424 of a first RFID reader 800a assumes that transponders 104 are affixed to motor vehicles 106 which can reasonably be assumed to be located on a road 834. An intersection of the cone and the road has a first shape 836 (e.g., a hyperbolic, ellipsoid, or parabolic shape, depending on the angle of the altitude axis of the cone relative to the ground) which can be expressed as:

$$(\tan(\alpha)\cdot x)^2-y^2=b^2$$

where b is a constant corresponding to the distance of a first RFID reader 800a from the ground.

A second RFID reader 800b is mounted in proximity to the first RFID reader 800a (e.g., mounted across the road) determines a second shape 838 (e.g., a hyperbolic, ellipsoid, or parabolic shape, depending on the angle of the altitude axis of the cone relative to the ground) on which the transponder 104 is also located. The two equations can be solved to determine the x and y coordinates of the transponder. In some examples, the two RFID readers 800a, 800b are time synchronized (e.g., using the network timing protocol).

2.3 Transponder Speed Determination

Figure 10:
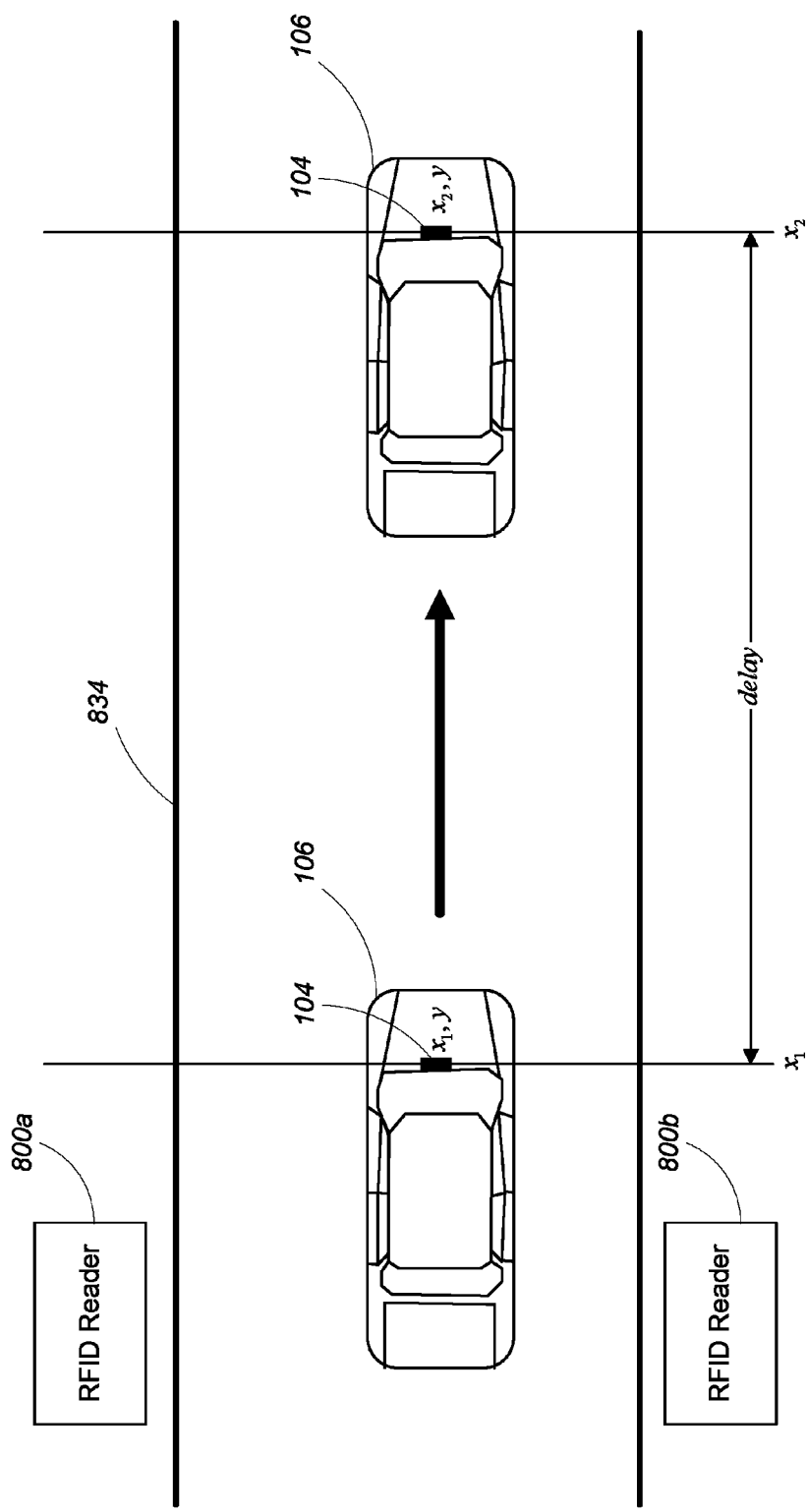
FIG. 10 shows speed estimation of a transponder attached to a vehicle.

Referring to FIG. 10, in some examples, systems with two RFID readers 800a, 800b can be used to determine a speed of a vehicle 106 traveling on the road by localizing a transponder 104 affixed to the vehicle 106 at two different locations and computing the total time the transponder took to travel between the two locations. The speed of the vehicle 106 can be expressed as:

$$v = \frac{x_2 - x_1}{\text{delay}}$$

where $x_1$ and $x_2$ are the first and second locations of the car and delay is the amount of time it took for the transponder 104 to travel between the two locations.

In some examples, the accuracy of localizing the transponder at positions $x_1$ and $x_2$ and the estimation of the delay depends on how well the two readers are synchronized. The error in the positions $x_1$ and $x_2$ can be upper bounded using the equation described above, independent of time synchronization. This error depends on the height of the readers and the number of lanes in the same direction on the street. For example, for a four lane street (i.e., two lanes in each direction), where the antennas are attached to a 13 foot tall post, the maximum error is 8.5 feet.

The error in the delay is the same as the error in timing synchronization. Since the readers are connected to the internet via LTE modems, they can be synchronized to within tens of milliseconds using the network timing protocol.

The accuracy of the speed estimation depends on the accuracy of the above parameters as well as how far $x_1$ and $x_2$ are from each other. The greater the distance, the more accurate the speed estimate. In some examples, the accuracy is further improved by taking multiple measurements as the transponder travels down the street.

3 Transponder Signal Decoding

Figure 11:
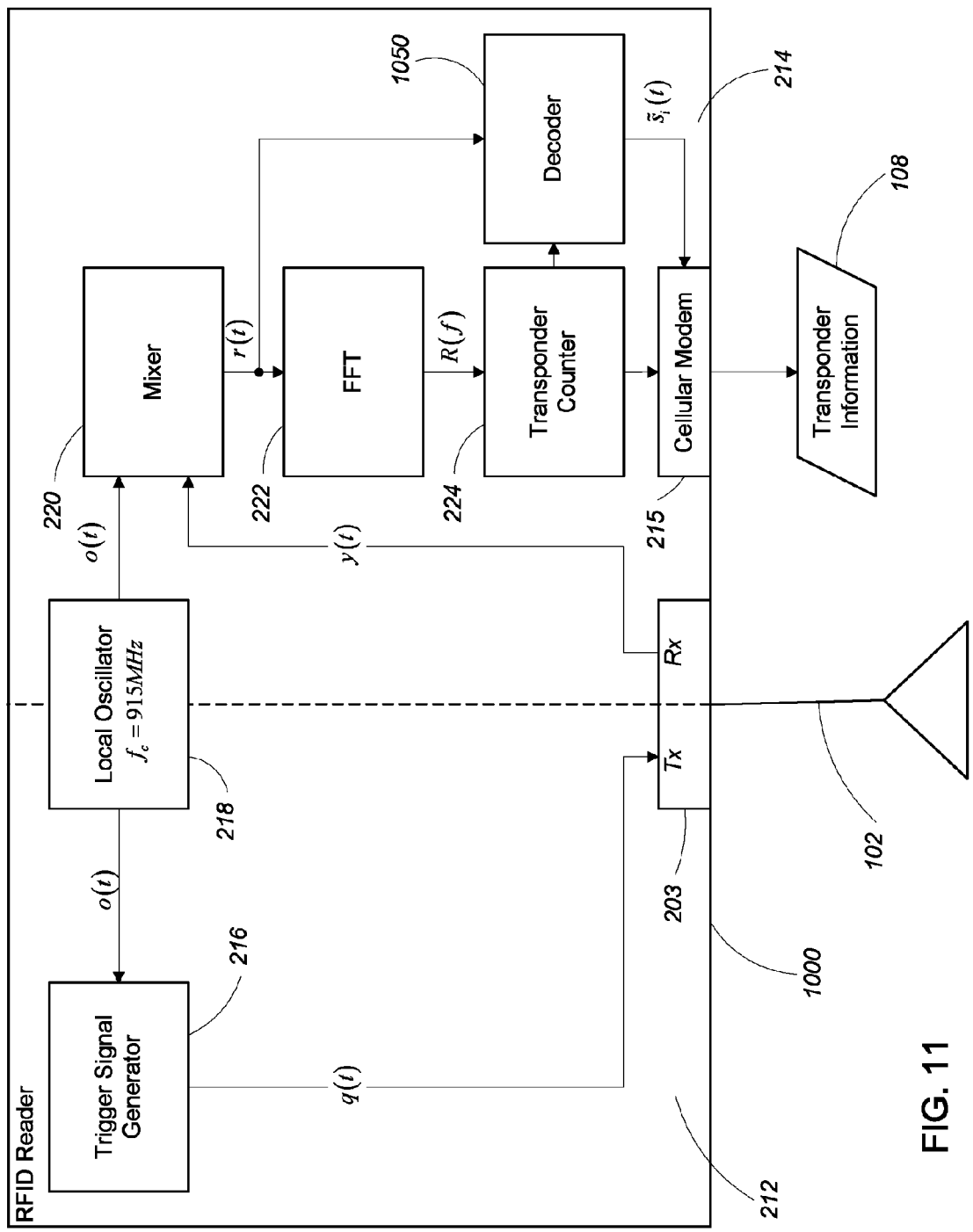
FIG. 11 is a schematic block diagram of the RFID reader of FIG. 1 including a decoder module.

Referring to FIG. 11, in some examples, an RFID reader 1000 (e.g., an alternative configuration of the RFID reader 100 of FIG. 3) includes a decoder 1050 for decoding the transponder identifiers from a signal that includes multiple, temporally overlapping responses from multiple transponders. Due to the use of on-off keying to encode the transponder identifiers, the decoder 1050 can not solely use the approach of isolating the peaks associated with the carrier frequency offsets of the transponders using band-pass filtering techniques. This is due to the wide spectrum of on-off keying which causes the signal to be spread over a wide portion of the spectrum rather than concentrated around the peaks.

Instead, the decoder 1050 uses an approach that combines the temporally overlapping response signals in a manner that ensures that a signal from a transponder of interest combines coherently, whereas the signals from other transponders combine incoherently. As a result, the signal to noise ratio of the transponder of interest is boosted above the others and is more easily decoded.

In particular, when the RFID reader 1000 transmits a query signal, multiple transponders respond substantially simultaneously. Without the loss of generality, it is assumed that a first transponder (i.e., "transponder 1") is the transponder of interest. In this case, the baseband combined response signal can be expressed as:

$$r(t) = h_1 s_1(t) \cdot e^{j2\pi \Delta f_1 t} + \sum_i h_i s_i(t) \cdot e^{j2\pi \Delta f_i t}$$

If the RFID reader 1000 transmits another query, the baseband combined response signal is expressed as:

$$r'(t) = h'_1 s_1(t) \cdot e^{j2\pi \Delta f_1 t} + \sum_i h'_i s_i(t) \cdot e^{j2\pi \Delta f_i t}$$

Note that the channel coefficients are different in the two response signals. The difference is due to the fact that the transponders start with a random initial phase. The channels, $h_1$ and $h'_1$ as well as the carrier frequency offset, $\Delta f_i$ can be estimated using the approaches described above. The decoder 1050 then compensates for the carrier frequency offset, $\Delta f_i$ and the channels, $h_1$ and $h'_1$ and then sums the received baseband combined response signals to obtain the averaged signal, $\tilde{s}_1(t)$:

$$\tilde{s}_1(t) = \frac{r(t)}{h_1} \cdot e^{j2\pi \Delta f_1 t} + \frac{r'(t)}{h'_1} \cdot e^{j2\pi \Delta f_1 t}$$

$$= 2 \cdot s_1(t) + \sum_i \left( \frac{h_i}{h_1} + \frac{h'_i}{h'_1} \right) s_i(t) \cdot e^{j2\pi (\Delta f_i - \Delta f_1) t}$$

The decoder 1050 repeats this process N times, yielding:

$$\tilde{s}_1(t) = N \cdot s_1(t) + \sum_i \left( \sum_j \frac{h_{ij}}{h_{1j}} \right) s_i(t) \cdot e^{j2\pi (\Delta f_i - \Delta f_1) t}$$

As can be seen from the equation above, the signals from the transponder of interest, transponder 1, add coherently while the other signals add incoherently with random phases and average out. For a sufficiently large N, the signal power for transponder is much greater than that of the other transponders, allowing the decoder 1050 to decode the signal.

4 RFID Reader Media Access Protocol (MAC)

In some examples, when two RFID readers have overlapping ranges, a query signal broadcast from one RFID reader may collide with a response signal from a transponder that was queried by another, different RFID reader. Such a collision may render the both the query signal and the response signal useless to their respective destination devices.

To avoid such collisions, some embodiments of the RFID readers implement a carrier sense approach. In particular, each RFID reader monitors the medium before transmitting a query. If the medium is available, then the RFID reader transmits its query. In some examples, the query signal has a typical length of 20 μs and the delay between the query signal and the transponder response signal is 100 μs. Thus, the RFID reader listens for at least 120 μs before transmitting its query signal. After 120 μs the RFID reader can safely transmit its query signal since it can guarantee that no transponder response will be transmitted after the 120 μs.

In some examples, since the queries transmitted by the RFID readers are simple sine waves, collisions between the queries are acceptable and no contention window is required in the RFID reader MAC protocol.

5 Alternatives

In some examples, the accuracy of embodiments that determine spatial locations of transponders is improved by adding a third antenna and arranging the three antennas in an equilateral triangular pattern. In particular, the accuracy in calculating the spatial angle, α from the reader to the transponder is highest for spatial angles of 90° and degrades for angles around 0° or 180° due to the fact that Δφ is proportional to cos(α). At localization time, a pair of the three antennas with a spatial angle closest to 90° is used to determine the spatial location of the transponder.

In some examples, the transmitter section of the RFID reader includes a simple frequency synthesizer (e.g., a PLL) that is turned on and off by a microcontroller to emit a query signal.

In some examples, the FFT module of the RFID reader uses a sparse FFT approach such as the approach described in Hassanieh, Haitham et al. "Simple and practical algorithm for sparse Fourier transform." Proceedings of the Twenty-Third Annual ACM-SIAM Symposium on Discrete Algorithms, Jan. 17-19, 2012, Kyoto, Japan.© 2012 by the Society for Industrial and Applied Mathematics.

In some examples, power consumption of the RFID reader is reduced by duty cycling the RFID reader. For example, the RFID reader can be operated for 10 ms and then turned off for a period of time that achieves a desired power consumption.

In the examples described above, certain characteristics are determined at the RFID reader and are then sent over a network to a facility which uses the characteristics to take some action such as adjusting traffic light patterns or billing customers. However, it is noted that in some embodiments, the RFID reader itself may be able to perform actions autonomously without ever sending any information to another facility. Furthermore, in other examples, the RFID reader may gather data and do as little processing on the data as possible before sending the data to the facility over the network. Then the facility can do the bulk of the processing, thereby reducing the complexity of the RFID reader.

6 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data recordings; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method for processing a concurrently triggered response signal at a plurality of transceivers configured to operate at a channel carrier frequency, at least some of the transceivers having distinct transmit carrier frequencies offset from the channel carrier frequency, the method comprising:
   receiving, at a first receiver, a response signal in response to a trigger signal, the response signal including a combination of a plurality of transceiver response signals, each transceiver response signal of the plurality of transceiver response signals corresponding to a different transceiver of the plurality of transceivers and having a distinct transmit carrier frequency, wherein at least some of the transceiver response signals overlap in time; and
   determining characteristics of the plurality of transceivers based on the carrier frequencies of the transceiver response signals, including determining a number of transceivers in the plurality of transceivers.

2. The method of claim 1 wherein the distinct transmit carrier frequencies of the at least some transceivers are due to manufacturing variations in the transceivers.

3. The method of claim 1 wherein the plurality of transceivers includes a plurality of transponders.

4. The method of claim 3 wherein each transponder of the plurality of transponders is carried by a vehicle and determining the number of transceivers in the plurality of transceivers includes determining a number of vehicles in a vicinity of the first receiver.

5. The method of claim 1 wherein determining the number of transceivers in the plurality of transceivers includes identifying a number of spectral peaks in a spectral representation of the response signal, each spectral peak corresponding to one or more carrier frequencies of one or more transceivers of the plurality of transceivers.

6. The method of claim 5 determining the number of transceivers in the plurality of transceivers includes determining that at least one of the spectral peaks in the spectral representation of the response signal corresponds to two or more transceivers of the plurality of transceivers.

7. The method of claim 6 wherein determining that the at least one spectral peak corresponds to two or more transceivers of the plurality of transceiver includes comparing a first magnitude of the at least one spectral peak in the response signal to a second magnitude of the at least one spectral peak in a second, time shifted version of the response signal, and identifying the at least one spectral peak as corresponding to two transceivers based on a difference between the first magnitude and the second magnitude.

8. The method of claim 1 wherein determining the characteristics of the plurality of transceivers includes, for each transceiver of the one or more transceivers, determining a first angle of arrival of the transceiver response signal corresponding to the transceiver at the first receiver.

9. The method of claim 8 wherein determining the characteristics of the plurality of transceivers further includes determining spatial locations for one or more transceivers of the plurality of transceivers based on the first angle of arrival determined for the one or more transceivers.

10. The method of claim 9 wherein determining the spatial locations for the one or more transceivers includes,
   receiving the response signal at a second receiver, and
   for each transceiver of the one or more transceivers,
      determining a second angle of arrival of the transceiver response signal corresponding to the transceiver at the second receiver, and
      determining the spatial location of the transceiver based on the first angle of arrival and the second angle of arrival.

11. The method of claim 1 wherein determining the characteristics of the plurality of transceivers includes determining a plurality of transceiver identifiers, each transceiver identifier of the plurality of transceiver identifiers corresponding to a different transceiver of the plurality of transceivers.

12. The method of claim 11 wherein determining the plurality of transceiver identifiers includes, for each transceiver of the plurality of transceivers,
   processing a plurality of response signals received during a time interval based on the distinct carrier frequency corresponding to the transceiver and the channel between the transceiver and the receiver; and
   determining an average response signal from the plurality of processed response signals.

13. The method of claim 1 wherein at least some transceivers of the plurality of transceivers are RFID transceivers.

14. The method of claim 1 further comprising determining an occupancy status for each of a plurality of parking spaces in range of the first receiver based on the characteristics of the plurality of transceivers.

15. A system for processing a concurrently triggered response signal at a plurality of transceivers configured to operate at a channel carrier frequency, at least some of the transceivers having distinct transmit carrier frequencies offset from a channel carrier frequency, the system comprising:
- a first receiver including one or more antennas for receiving a response signal in response to a trigger signal, the response signal including a combination of a plurality of transceiver response signals, each transceiver response signal of the plurality of transceiver response signals corresponding to a different transceiver of the plurality of transceivers and having a distinct transmit carrier frequency, wherein at least some of the transceiver response signals overlap in time; and
- one or more processors configured to implement one or more signal processing modules for determining characteristics of the plurality of transceivers based on the carrier frequencies of the transceiver response signals, including determining a number of transceivers in the plurality of transceivers.

16. The system of claim 15 wherein the distinct transmit carrier frequencies of the at least some transceivers are due to manufacturing variations in the transceivers.

17. The system of claim 15 wherein the plurality of transceivers includes a plurality of transponders.

18. The system of claim 17 wherein each transponder of the plurality of transponders is carried by a vehicle and determining the number of transceivers in the plurality of transceivers includes determining a number of vehicles in a vicinity of the first receiver.

19. The system of claim 15 wherein the one or more processors configured to implement the one or more signal processing modules are configured to determine the number of transceivers in the plurality of transceivers including identifying a number of spectral peaks in a spectral representation of the response signal, each spectral peak corresponding to one or more carrier frequencies of one or more transceivers of the plurality of transceivers.

20. The system of claim 19 wherein the one or more processors configured to implement the one or more signal processing modules are configured to determine the number of transceivers in the plurality of transceivers including determining that at least one of the spectral peaks in the spectral representation of the response signal corresponds to two or more transceivers of the plurality of transceivers.

21. The system of claim 20 wherein the one or more processors configured to implement the one or more signal processing modules are configured to determine that the at least one spectral peak corresponds to two or more transceivers of the plurality of transceiver including comparing a first magnitude of the at least one spectral peak in the response signal to a second magnitude of the at least one spectral peak in a second, time shifted version of the response signal, and identifying the at least one spectral peak as corresponding to two transceivers based on a difference between the first magnitude and the second magnitude.

22. The system of claim 15 wherein the one or more processors configured to implement the one or more signal processing modules are configured to determine the characteristics of the plurality of transceivers including, for each transceiver of the one or more transceivers, determining a first angle of arrival of the transceiver response signal corresponding to the transceiver at the first receiver.

23. The system of claim 22 wherein the one or more processors configured to implement the one or more signal processing modules are configured to determine the characteristics of the plurality of transceivers including determining spatial locations for one or more transceivers of the plurality of transceivers based on the first angle of arrival determined for the one or more transceivers.

24. The system of claim 23 wherein the one or more processors configured to implement the one or more signal processing modules are configured to determine the spatial locations for the one or more transceivers including,
- receiving the response signal at one or more antennas of a second receiver, and
- for each transceiver of the one or more transceivers,
  - determining a second angle of arrival of the transceiver response signal corresponding to the transceiver at the second receiver, and
  - determining the spatial location of the transceiver based on the first angle of arrival and the second angle of arrival.

25. The system of claim 15 wherein the one or more processors configured to implement the one or more signal processing modules are configured to determine the characteristics of the plurality of transceivers including determining a plurality of transceiver identifiers, each transceiver identifier of the plurality of transceiver identifiers corresponding to a different transceiver of the plurality of transceivers.

26. The system of claim 25 wherein the one or more processors configured to implement the one or more signal processing modules are configured to determine the plurality of transceiver identifiers including, for each transceiver of the plurality of transceivers,
- processing a plurality of response signals received during a time interval based on the carrier frequency corresponding to the transceiver and the channel between the transceiver and the receiver; and
- determining an average response signal from the plurality of processed response signals.

27. The system of claim 15 wherein at least some transceivers of the plurality of transceivers are RFID transceivers.

28. The system of claim 15 wherein the one or more processors configured to implement the one or more signal processing modules are configured to determine an occupancy status for each of a plurality of parking spaces in range of the first receiver based on the characteristics of the plurality of transceivers.

* * * * *